(No Model.)
C. HAYES.
COMBINED HARROW AND CULTIVATOR.
No. 357,928. Patented Feb. 15, 1887.
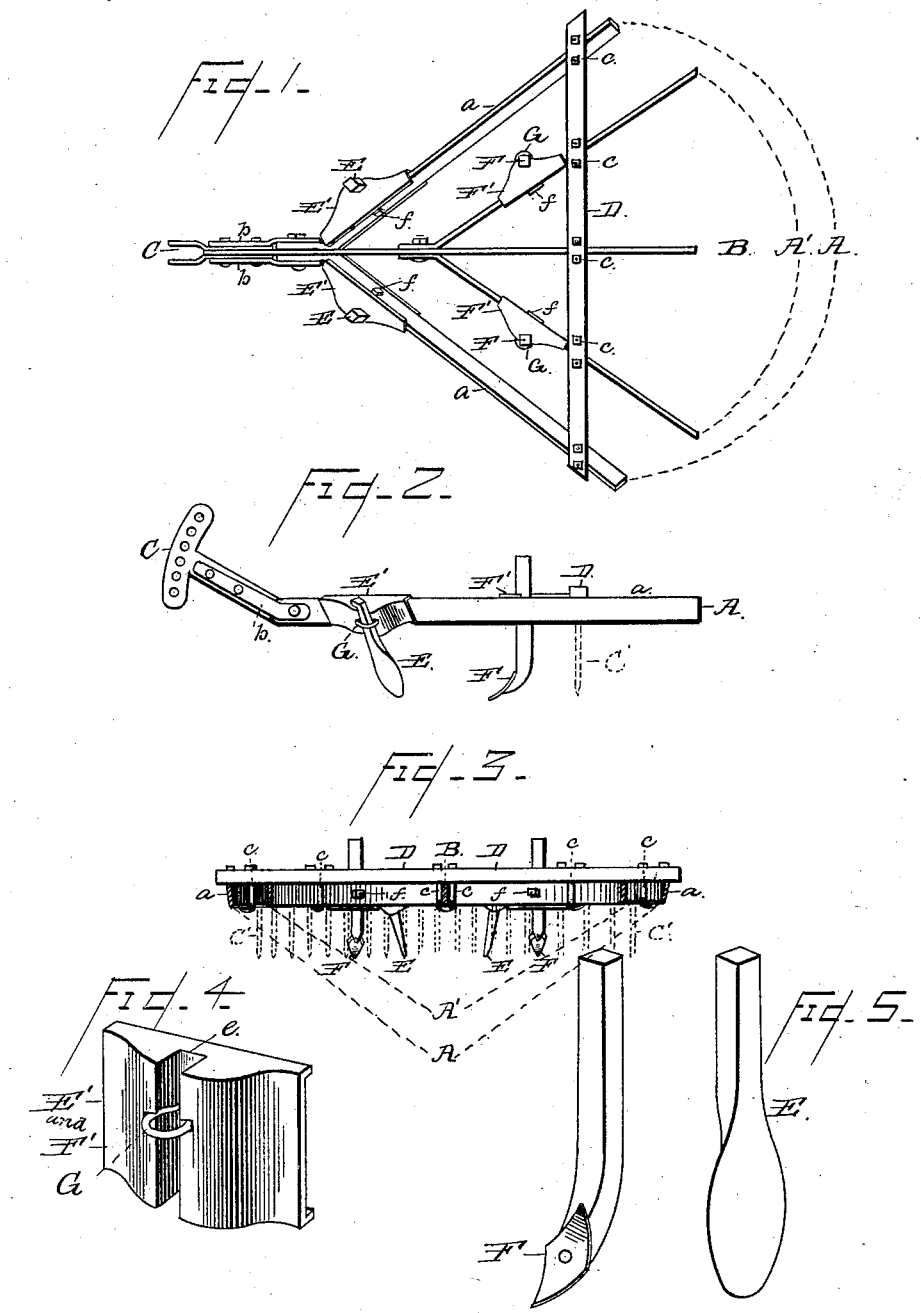
Witnesses
Tonius H Clark.
Jno. C. Schroeder.
Charles Hayes   Inventor
By his Attorney
Geo. W. Dyer

United States Patent Office.

CHARLES HAYES, OF DUBUQUE, IOWA, ASSIGNOR TO JOHN DUGGAN, OF SAME PLACE.

COMBINED HARROW AND CULTIVATOR.

SPECIFICATION forming part of Letters Patent No. 357,928, dated February 15, 1887.

Application filed July 10, 1886. Serial No. 207,669. (No model.)

*To all whom it may concern:*

Be it known that I, CHARLES HAYES, of Dubuque, in the county of Dubuque and State of Iowa, have invented a new and useful Improvement in Combined Harrows and Cultivators; and I do hereby declare that the following is a full and exact description of the same, reference being had to the accompanying drawings, and to the letters of reference marked thereon.

My invention relates to a combined harrow and cultivator comprising a series of knives and cultivator shovels or plows; and the novelty lies in the construction and arrangement of these devices, in the construction of the frame, and in the combination of parts, all as and for the purposes more fully hereinafter described and claimed.

For a better comprehension and thorough understanding of my improvements as regards their construction and arrangement, attention is invited to the accompanying drawings, in which—

Figure 1 is a top plan view of an implement of this character constructed in accordance with my invention. Fig. 2 is a side view of the same; Fig. 3, a rear view; Fig. 4, a detail of the means for attaching the knives and shovels to the frame, and Fig. 5 a detail of the knife and shovel or plow used with this implement.

Like letters of reference denote corresponding parts in the several views.

The entire frame is made, preferably, from metal, and consists of two triangular sections, A A', the latter being arranged within the former, and both being secured at their forward ends, as shown, to the sides of a center beam, B. For the purpose of controlling the working depth of the harrow and making the draft as light as possible, the front end of this center beam, B, is bent or curved upward, and has secured to this end by means of metal straps *b b* a clevis, C, perforated lengthwise, so as to render the attachment of the double-tree adjustable.

The rear ends of the two frame-sections A A' are connected by a cross-bar, D, secured to each and to the center beam, B, by means of links *c c*, and this bar C may have a row or series of vertical harrow-teeth, C', as represented by the dotted lines in Fig. 3. The outer frame-section, A, is composed of two bars, *a a*, which are twisted or set at an angle to the inner frame-section, A', and the center beam, B. To each of these bars *a a* is attached a series of cutting-knives, E, by means of blocks or brackets E', presently to be described. These knives are set so as to point to the rear, and incline inwardly by reason of the twist or angle of the bars *a a*. The result of this arrangement is that they cut the soil into strips parallel with the line of draft, and do not clog.

The inner frame, A', is provided with a series of cultivator shovels or plows, F, attached by means of blocks or brackets F', presently to be described, and arranged to engage with the soil on a line midway between and parallel with the incisions made by the knives. This combined arrangement of the knives and shovels places the former in advance, and, besides the service they render in cutting clods and the like, they better prepare the soil for the action of the shovels or plows which follow.

The shanks of the knives and also the shovel or plow beams are preferably made square or of some other angular shape, and are set in similar-shaped notches *e*, cut in their respective blocks or brackets E' and F', and are held by an eyebolt, G, which passes through the block or bracket and the bar *a*, and is secured by a nut, *f*, on the inside. These blocks or brackets are made, preferably, from cast-iron grooved so as fit securely over the bars of the frame and render the knives and shovels adjustable, and also removable when it is desired to grind them or substitute new ones.

The blades of the knives are made ellipsoidal in shape for the purpose of giving a draw cut, and have double cutting-edges, so that when one edge becomes dull they can be reversed, and for a similar purpose the shovels or plows are made in the shape of a diamond. A series of shovels or plows may also be arranged along the center beam, B.

It will be apparent that the frame may be made of wood, with all the bars straight, and that, instead of using the blocks or brackets, the knives and the shovel or plow beams may be set in notches cut in the frame, and there secured by staples or the like driven into the wood.

By the use of a series of cutting-knives and cultivator shovels or plows arranged as herein set forth, it will be evident that the knives will pass over the trash and scour; that all clods or lumps of dirt lying in the path of the implement will be cut and thoroughly pulverized; that by the position of the knives the ground is better prepared for the action of the shovels or plows and harrow-teeth, and that by this preparation the soil can be more easily and quickly turned up, which makes the draft lighter.

Having thus described my invention, what I claim, and desire to secure by Letters Patent, is—

1. The combination, in a combined harrow and cultivator, of an inside triangular frame carrying a series of reversible plows or shovels and an outside triangular frame carrying a series of reversible knives with double cutting-edges, substantially as described.

2. The combination, in a combined harrow and cultivator, of an inside triangular frame carrying a series of diamond-shaped plows or shovels, secured at the center to their beams, and an outside triangular frame carrying a series of double-edged cutting-knives set at an angle to the frame, substantially as described.

3. The combination, in a combined harrow and cultivator, of an outside triangular frame carrying a series of inclined cutting-knives arranged to cut the soil into strips parallel with the line of draft, and an inside triangular frame carrying a series of plows or shovels arranged to engage with the soil between the cuts of the knives, substantially as described.

4. The combination, in a combined harrow and cultivator, of a center beam having a bent or curved-up front end provided with a clevis secured by metal strips at the sides, an outside and an inside triangular frame, both secured to the center beam at their front ends, a series of knives attached to the outside frame and a series of plows or shovels attached to the inside frame, and a rear cross-bar connected with the entire frame by means of U-bolts, substantially as described.

5. The combination, in a combined harrow and cultivator, of a center beam, an inside triangular frame, an outside triangular frame twisted or set at an angle thereto, a series of knives and plows attached to said frames, and a rear cross-bar provided with a row of harrow-teeth, substantially as described.

6. In a combined harrow and cultivator, the combination of center beam, B, the inside triangular section, A', the outside triangular section, A, twisted or set at an angle to the others, and the knives and plows attached to said sections, substantially as described, and for the purposes set forth.

7. In a combined harrow and cultivator, the combination, with a center beam and a triangular frame secured and set at an angle thereto, of a series of knives having ellipsoidal blades with double cutting-edges attached to said frame, so as to incline inwardly and to the rear, substantially as and for the purposes set forth.

8. In a combined harrow and cultivator, the combination, with a center beam, an inside triangular frame, and an outside triangular frame twisted or set at an angle thereto, of a series of cutting-knives having ellipsoidal blades with double cutting-edges secured to said outside frame, so as to incline inwardly and to the rear, and a series of diamond-shaped shovels secured to beams attached to the inside frame, so as to work on a line between the cut of the knives, substantially as and for the purposes set forth.

9. In a combined harrow and cultivator, the combination, with the center beam, B, the inside triangular frame-section, A', and the outside triangular frame-section, A, twisted or set at an angle thereto, of the blocks E' and F', grooved to fit said frames and provided each with a notch in the front, the knives E, with angular shanks and ellipsoidal blades, the plows or shovels F, secured to plow-beams with angular shanks, and the eyebolts G, substantially as described and shown.

In testimony whereof I affix my signature in presence of two witnesses.

CHARLES HAYES.

Witnesses:
MONROE W. CADEY,
JOHN DUGGAN.